United States Patent [19]
Lim et al.

[11] Patent Number: 5,993,519
[45] Date of Patent: Nov. 30, 1999

[54] METHOD OF EXCHANGING FILTERS IN A CLEAN ROOM AND AUXILIARY DEVICE FOR USE IN THE EXCHANGING OF THE FILTERS

[75] Inventors: Chang-su Lim; Hyun-joon Kim; Youn-soo Han; Kun-hyung Lee, all of Kyungki-do, Rep. of Korea

[73] Assignee: Samsung Electronics Co., Ltd., Suwon, Rep. of Korea

[21] Appl. No.: 09/113,145

[22] Filed: Jul. 10, 1998

[30] Foreign Application Priority Data

Jul. 25, 1997 [KR] Rep. of Korea ............... 97-35181

[51] Int. Cl.$^6$ .................................................. B01D 29/52
[52] U.S. Cl. ..................... 95/286; 55/385.2; 55/422; 55/484; 55/502; 454/187
[58] Field of Search ........................ 55/385.2, 309, 55/484, 483, 455, 284, 286, 480, 502; 454/187; 95/273, 286

[56] References Cited

U.S. PATENT DOCUMENTS

| | | | |
|---|---|---|---|
| 3,486,311 | 12/1969 | Allan, Jr. | 55/484 |
| 4,088,463 | 5/1978 | Smith | 55/480 |
| 4,334,896 | 6/1982 | Muller | 55/422 |
| 4,518,405 | 5/1985 | Lough et al. | 55/385 |
| 5,695,536 | 12/1997 | Fabrizi | 55/422 |

FOREIGN PATENT DOCUMENTS

2267816 12/1975 France ...................... 55/484

*Primary Examiner*—David A. Simmons
*Assistant Examiner*—Robert Hopkins
*Attorney, Agent, or Firm*—Jones Volentine, LLP

[57] ABSTRACT

An auxiliary device is used in the exchanging of a filter in a clean room having a production section, and a filter frame including a filter-supporting portion which supports the filter and an extending portion which extends from the filter-supporting portion toward the production section. The auxiliary device includes a block plate to be inserted in the extending portion of the filter frame, a support supporting the bottom of the block plate and facing an inside wall of the second portion of the filter frame, and an inflatable tube disposed along the circumference of the support. The tube is inflated to press outwardly and seal the device in the filter frame, thereby blocking the flow of any unfiltered air past the filter and into the production section. Thereafter, the filter is removed and a new filter is set in its place. Finally, the tube is deflated so as to free the device from the filter frame. Accordingly, the production operation as well as the circulation of cleaning air can proceed while the filter is being exchanged.

25 Claims, 9 Drawing Sheets

METHOD OF EXCHANGING FILTERS IN A CLEAN ROOM AND AUXILIARY DEVICE FOR USE IN THE EXCHANGING OF THE FILTERS

BACKGROUND OF THE INVENTION

1. Field of the Invention

The present invention relates to an auxiliary device for use in the exchanging of a filter in a clean room. The present invention also relates to a method in which the auxiliary device is used to exchange the filter.

2. Description of the Related Art

High-tech industries presently demand high-purity production environments to ensure the quality and yield of production products. In this respect, the precision, purity, and asepsis of the production line are especially important.

These characteristic requirements of a production environment have been greatly improved by the introduction of the clean room. Clean rooms include the Bio Clean Room (BCR) and the Industrial Clean Room (ICR). The Bio Clean Room (BCR) is used in the medical field for preventing bio-contamination during the manufacturing of medicine, drugs, and foods, and during genetic engineering, etc. The Industrial Clean Room (ICR) is used in the more industrial fields for preventing particles from contaminating such products as semiconductor devices, precise machinery, raw materials, etc.

The semiconductor device fabrication process requires a clean room in which a down stream laminar flow is formed in a production line in order to remove particles which would otherwise have an enormous adverse effect on the performance of the final semiconductor devices and thus, on the production yield.

The Down Stream Laminar Flow Type of clean room is good for quickly removing the particles generated by the various equipment in the production line, by the various materials that are used in the manufacturing process or by operators of the production line. Various methods of developing a down stream laminar flow are being developed along with the continuous development of the make-up of the production line and its maintenance.

The structure and function of a clean room which forms a down stream laminar flow thereinside will next be described referring to FIG. 1.

As shown in FIG. 1, a grating 14 having a plurality of holes is installed on a frame 12 which is set a certain distance above the bottom of the clean room 10. The clean room is thus divided into an upper portion and a lower portion by the grating 14.

Above the grating 14 is a production line 16 comprising the equipment for fabricating semiconductor devices (not shown in the figure for the sake of clarity). On the other hand, below the grating 14 is an auxiliary facility for assisting the fabrication equipment (also not shown in the figure) and a circulation pan 18 for circulating the air inside the clean room 10.

The circulation pan 18 induces air from the upper portion of the clean room 10 to the lower portion thereof by suction and then recirculates the air to the production line 16 through a passage 20 defined in the sidewall of the clean room 10.

Meanwhile, a plurality of filters 22 are installed above the production line 16 for filtering the air. These filters 22 are supported by a filter frame 24. The air is forced through the filters 22 by the pressure formed by the circulation pan 18 and is then directed into the production line 16. The air passing through the filters 22 and directed downwards into the production line 16 passes through the holes of the grating 14 to thereby form a down stream laminar flow.

The particles continuously generated inside the production line 16 are discharged toward the lower portion of the clean room 10 by the down stream laminar flow in order to maintain highly pure state of the clean room 10.

In the meantime, when a filter becomes damaged or contaminated enough, the particles in the air are not filtered by the damaged or contaminated filter 22. This contaminated air spreads quickly, and adversely affects the formation of the down stream laminar flow. As a result, the production line 16 is contaminated.

In order to prevent this problem, the filters 22 are regularly inspected. Any filter found to be damaged is replaced. However, if the filter is replaced while the air is continuously circulated, a large amount of contaminated air is induced into the production line 16 through an open area at the place where the filter has been removed. Accordingly, the production line 16 will become contaminated.

A conventional method of exchanging a damaged filter has been used in an attempt to prevent such a contamination of the production line 16 from occurring. Referring now to FIG. 2, in the conventional method, a curtain of anti-electrostatic vinyl 26 is hung between the filter frame 24 and the grating 14 at that portion of the filter frame 24 which supports the filter to be exchanged. The ends of the curtain of anti-electrostatic vinyl 26 adjacent the grating 14 and the filter frame 24 are sealed with adhesive members 28, respectively. Then, the damaged filter 22 is replaced by first removing the damaged filter into the space above the filter frame 24.

However, when the damaged filter 22 is replaced, the air existing in the space above the filter frame 24 moves toward the open area due to a pressure differential existing above and below the filter frame 24.

Unfortunately, air passing within the curtain of anti-electrostatic vinyl 26 is under such pressure that it separates the seals at the respective ends of the curtain of anti-electrostatic vinyl 26. The induced, non-filtered air spreads through these openings in the seals and contaminates the production line 16.

Therefore, the conventional method of exchanging a filter 22 requires the various operating portions of the production line 16 to be first shut down. Further, the method is carried out while the air circulation is also shut down. Afterwards, the production line facilities must be restarted. Accordingly, carrying out the conventional method of exchanging a damaged or contaminated filter results in a great reduction in the productivity of the line 16.

SUMMARY OF THE INVENTION

An object of the present invention is to overcome one or more of the problems, limitations and disadvantages of the prior art.

More specifically, an object of the present invention is to provide an auxiliary device which allows a damaged filter above a production line to be easily and rapidly replaced while the production facilities are in operation, and while the air in the room is being circulated, thereby improving productivity and increasing the up-time of the facility compared to the case where the prior art method is used.

To achieve these and other objects, the auxiliary device includes a block plate sized to fit within a portion of the filter frame extending below the filter to be replaced. A support is formed at the bottom of the block plate and faces the inside wall of the filter frame. A tube is disposed along the circumference of the support, the tube having an air passage through which air can be introduced to inflate the tube and seal the device within the filter frame.

The support forms an annular concavity in which the tube is accommodated, and the upper portion of the support is integrated with the bottom of the block plate at the periphery thereof.

A handle is provided on the bottom of the support. The handle allows an operator to grasp the device and position it in the filter frame and to remove it therefrom.

The tube is made of an elastic polymer, and a sealing member may be provided to block any gap left between the filter frame and the outer side of the tube.

In addition, the block plate may include a support plate having a central opening therein and a transparent member covering the central opening. The upper plate has a central opening aligned with the transparent member so as to form a window with the transparent member and the central opening of the support plate.

The transparent member is interposed between the support plate and the upper plate, and the upper plate has a bearing member extending into the central opening and supporting the bottom of the transparent member.

Rings are formed on the bottom of the filter frame, and a tether(s) is fixed to the bottom of the support. The tether(s) can be linked to the rings so as to prevent the auxiliary device from falling should it become inadvertently dislodged from the filter frame.

Another form of the auxiliary device has a temporary frame which is to be inserted into the filter frame. The temporary frame has a side wall defining an outer surface which is to face an inner side wall surface of the filter frame, an inner surface, and a protrusion extending inwardly from the inner surface. The inflatable tube is disposed along the outer surface of the side wall of the temporary frame. Moreover, an auxiliary filter is supported by the protrusion.

BRIEF DESCRIPTION OF THE DRAWINGS

These and other objects, features and advantages of the present invention will become clearer from the following detailed description of preferred embodiments thereof made with reference to the accompanying drawings, of which.

DETAILED DESCRIPTION OF THE PREFERRED EMBODIMENTS

Reference will now be made in detail to the preferred embodiments of the present invention which are illustrated in the accompanying drawings.

Figure 1:
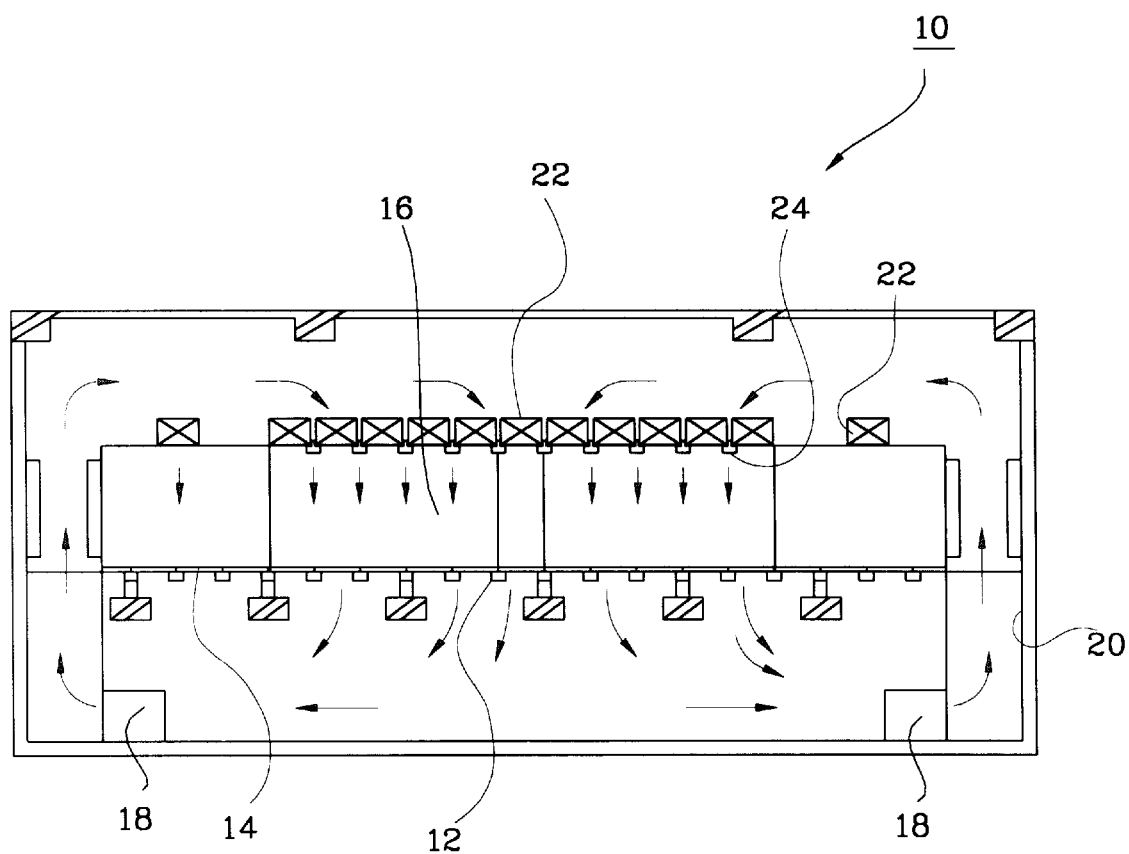
FIG. 1 is a schematic diagram of a conventional clean room in which semiconductor devices are manufactured.
Figure 2:
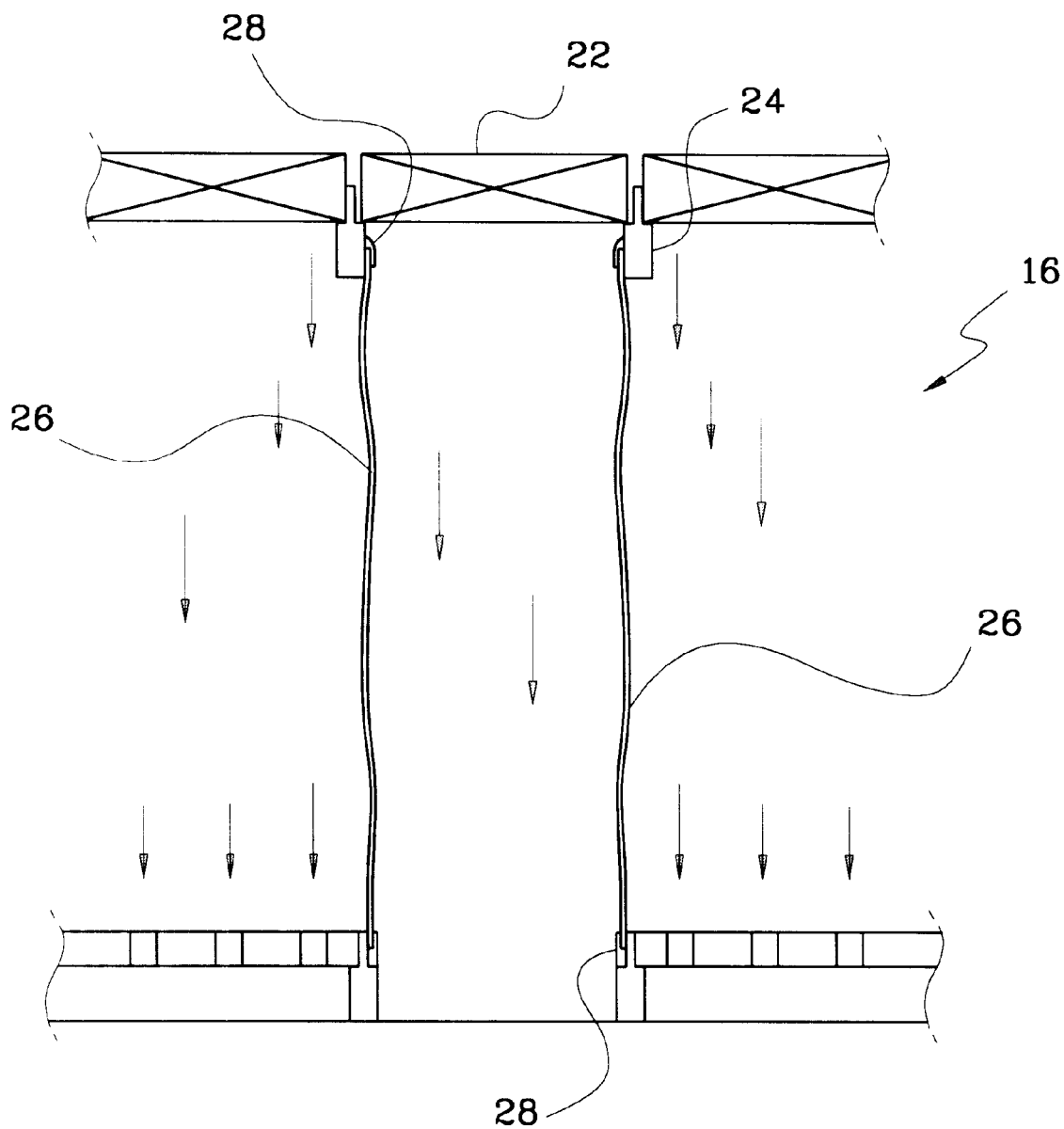
FIG. 2 is a sectional view of a portion of the clean room, showing a conventional auxiliary device for use in the exchanging of a filter.
Figure 3:
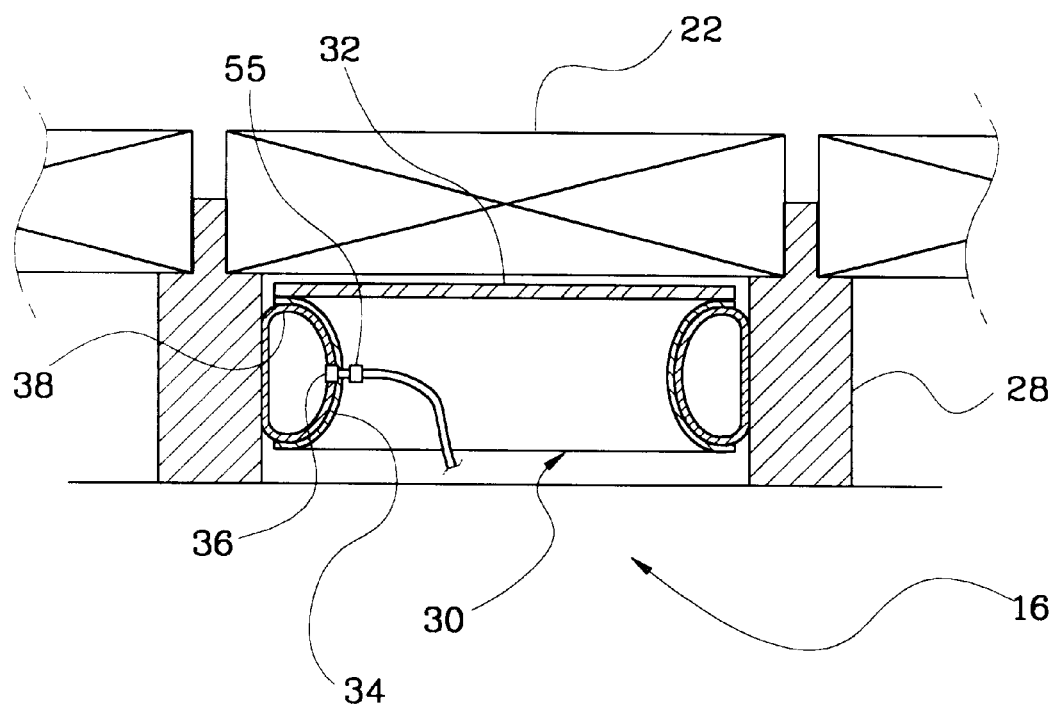
FIG. 3 is a sectional view of a first embodiment of an auxiliary device for use in the exchanging of a filter in a clean room according to the present invention.

Referring first to FIG. 3, a filter 22 for filtering the air introduced into the production line 16 of a clean room is provided in a lattice-shaped filter frame 28 installed above the production line 16. The air inside the clean room is circulated by a circulation pan.

The filter frame 28 extends downwardly from the filter 22 toward the production line 16. For the purposes of this description the term production line will be used to refer to that section of the clean room in which an operation, requiring the removal of contaminants by an air stream, is carried out.

In order to exchange a damaged or contaminated filter, an auxiliary device 30 is mounted to that portion of the lattice-shaped filter frame 28 which extends downwardly from the filter-supporting portion of the filter frame 28. As can be seen from FIG. 3, the auxiliary device 30 blocks the air stream passing through that portion of the filter frame 28.

The auxiliary device 30 comprises a block plate 32 sized to fit in the filter frame 28 when inserted downwardly toward the production line. A support 34 is formed at the bottom of the block plate 32 and faces an inner wall surface of the filter frame 28 when mounted to the frame 28. A tube 38, having an air passage 36, is adhered to the filter frame 28 along the circumference of the support 34 for sealing the production line from the space above the filter frame 28.

The support 34 comprises a plurality of plates, each of them facing a corresponding inner wall surface of the filter frame 28. Furthermore, these plates each have a concave shape so as to together define an annular concavity in which the tube 38 is received. The top of the support 34 is welded to the periphery of the bottom of the block plate 32 as shown in FIG. 3.

Figure 4:
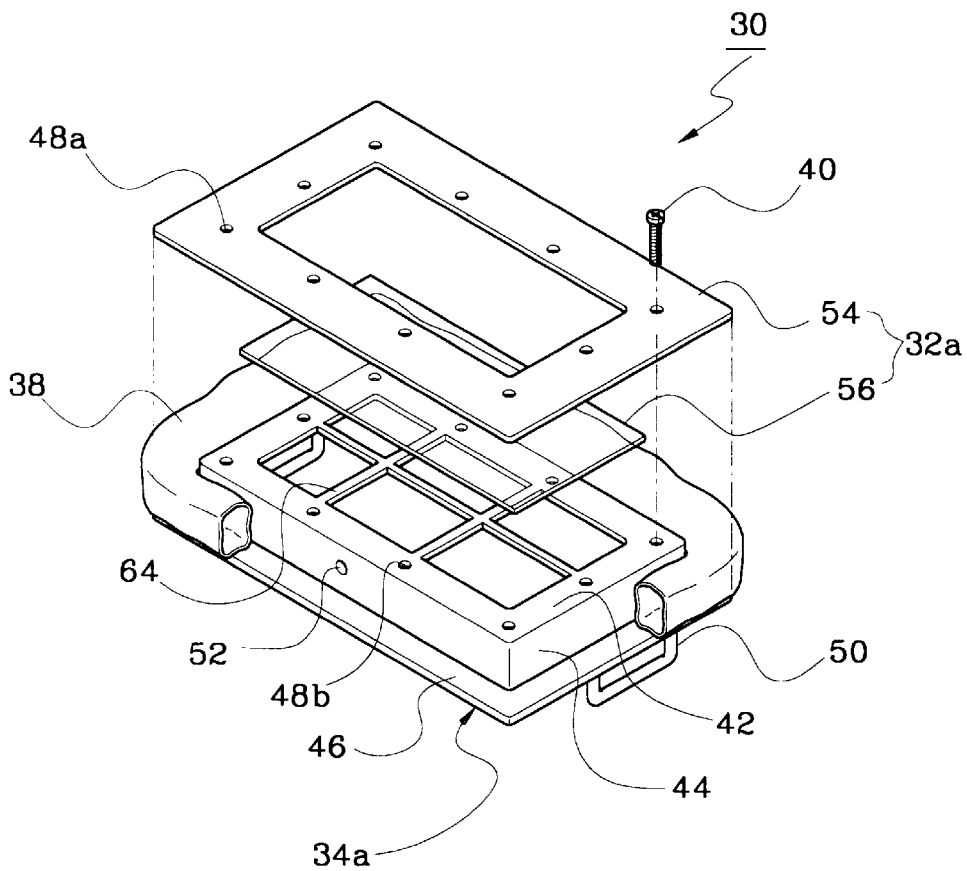
FIG. 4 is an exploded perspective view of a second embodiment of an auxiliary device for use in the exchanging a filter in a clean room according to the present invention.
Figure 5:
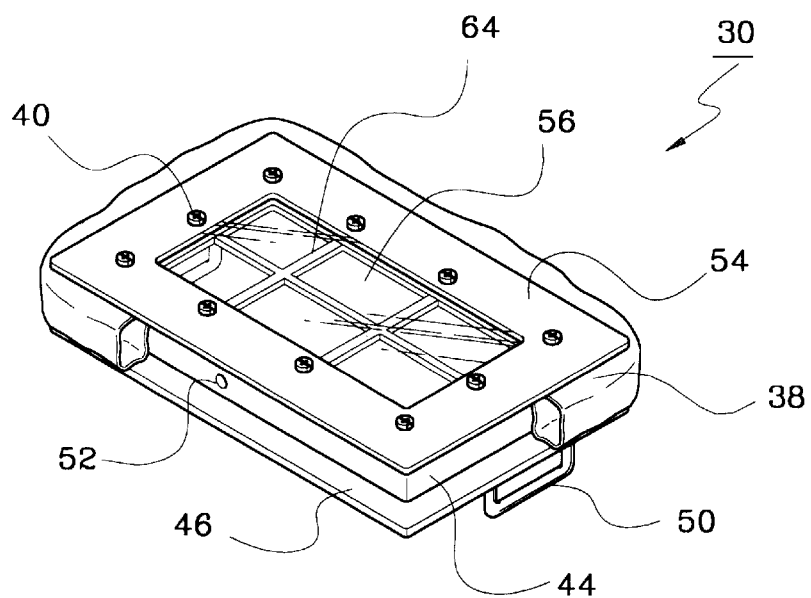
FIG. 5 is a perspective view of the auxiliary device of FIG. 4 but shown in an assembled state.
Figure 6:
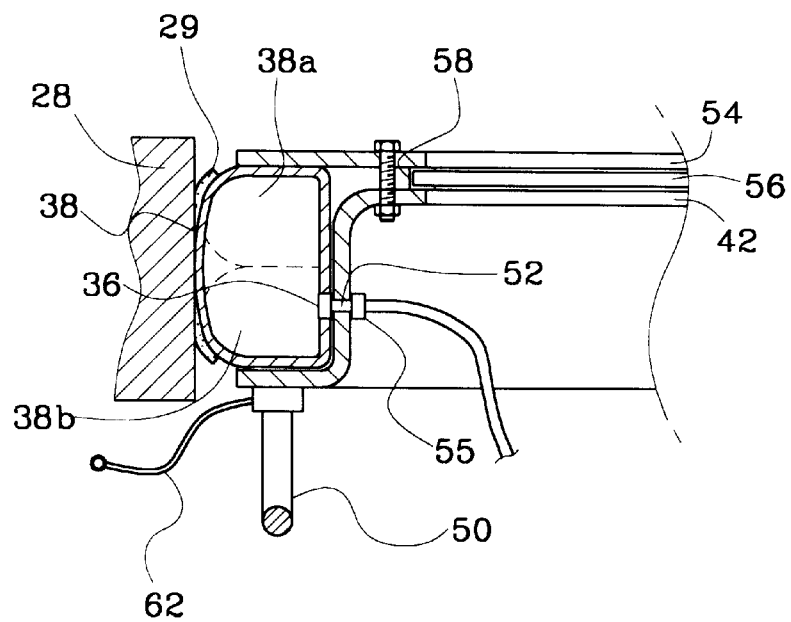
FIG. 6 is a sectional view of an enlarged portion of the same.

FIGS. 4 through 6 show an alternative embodiment in which a block plate 32a and support 34a are secured by locking means 40 and together form the concavity in which the tube 38 is accommodated.

The support 34a comprises an upper plate 42 facing the bottom of the block plate 32a, a side wall 44 extending downwardly from the periphery of the upper plate 42, and a protrusion plate 46 extending outwardly from the bottom of the side wall 44.

In addition, aligned locking holes 48a, 48b are formed in the periphery of the block plate 32a and in the periphery of the upper plate 42 of the support 34a, respectively. The block plate 32a and the support 34a are connected by locking them together with the locking means 40. The locking means 40 can be screws or bolts and the locking holes 48a, 48b through which they are inserted.

In addition, a penetrating passage 52 extends through the side wall 44 at a location corresponding to the air inlet 36. The passage 52 can be connected with the connector end 55 of a line through which air passes into the tube 38.

A handle 50 is provided on the bottom of the support 34a so that an operator can easily grasp and maneuver the auxiliary device 30.

The tube 38 is made of an elastomer material. That is, any elastic polymer such as rubber can be employed for the tube 38. A plurality of tubes 38 or layers of tubes can be used to adhere the auxiliary device 30 to the filter frame 28. Preferably two tubes 38a and 38b are provided top to bottom (phantom lines in FIG.6) between the filter frame 28 and the side walls 44 in the auxiliary device. The plurality of tubes or layers of tubes may be interconnected so that only one means of inflation is required, or a separate means of inflation can be provided for the other tubes.

In addition, the tube 38 can be shaped corresponding to the shape of the filter frame 28 to closely adhere thereto in order to prevent any gap from forming between the auxiliary device 30 and the filter frame 28 during the expansion of the tube 38 with the air introduced therein.

As another way to prevent a gap from forming between the filter frame 28 and its corresponding side of the tube 38, the side of the filter frame 28 can be curved inward, or a curved sealing or contact member 29 can be mounted to the side of the filter frame 28 to accommodate for the curve in the outer side portion of the tube 38.

The block plate 32a also includes a confirmation window which allows the exchanging of the filter 22 to be monitored. The window is formed by a transparent member 56, and an opening in the center of the support plate 54. The upper plate 42 also has an opening in a central portion thereof, and the periphery of the transparent member 56 rests on the periphery of the upper plate 42 around the central opening therein.

In addition, a sealing member 58 (FIG.6) is fixed to the periphery of the transparent member 56. The sealing member 58 sticks to the support plate 54 and to the upper plate 42 in order to provide a seal around the transparent member 56. The transparent member 56 is made of an anti-electrostatic acrylic material.

Figure 7:
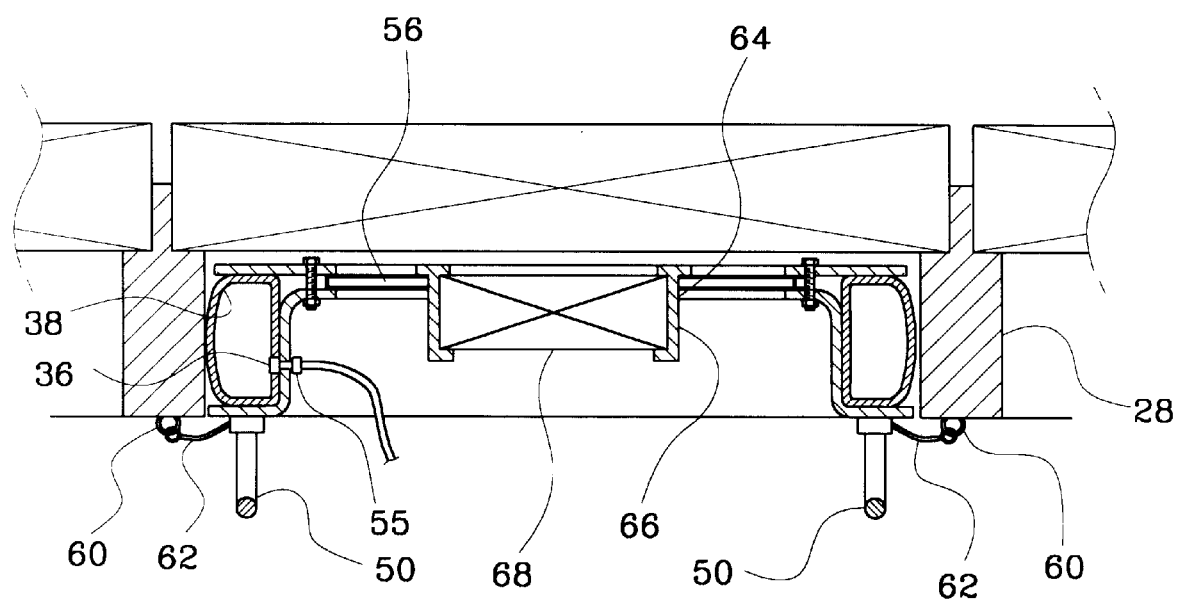
FIG. 7 is a sectional view of a portion of a clean room in which is installed still another embodiment of an auxiliary device for use in the exchanging of a filter according to the present invention.

Although the auxiliary device 30 adheres to the filter frame 28 due to the expansion of the tube 38, it is nevertheless sometimes released therefrom by the pressure of the air in the space above the filter frame 28. Accordingly, as shown in FIG. 7, rings 60 are formed on the bottom of the filter frame 28, and a respective chain or other tether 62 is fixed to the bottom of the support 34a and is linked to each ring 60. The tether system keeps the auxiliary device from falling onto the production line should it become dislodged from the filter frame 28.

In addition, a load bearing support grid 64 (FIG. 4) is formed in the central opening of the upper plate 42 for supporting the bottom of the transparent member 56. This prevents the transparent member 56 from being distorted by the pressure of the air in the space above the filter frame 28.

In the embodiment of FIG. 7, the transparent member 56 and the bearing support 64 have central openings therein. The block plate 32a has means for reducing the pressure difference of the air above and below the filter 22. More specifically, a mounting member 66 extends through the openings in the transparent member 56 and bearing support 64. The mounting member 66 has the form of a container. An auxiliary filter 68 can be mounted to the block plate 32a in the mounting member 66 to filter air. The mounting member 66 may be an integral or unitary part of the block plate 32a.

Figure 8:
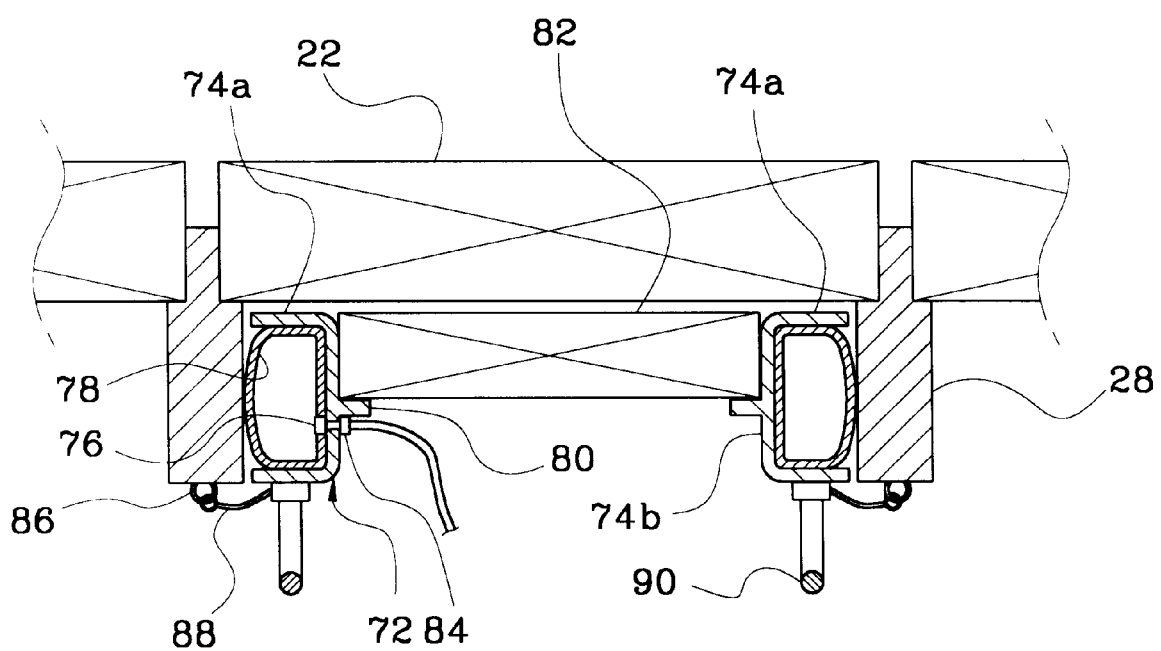
FIG. 8 is a view similar to that of FIG. 7 but showing a further embodiment of the auxiliary device for use in the exchanging of a filter according to the present invention.

FIG. 8 shows another embodiment of the auxiliary device according to the present invention. This embodiment of the auxiliary device comprises a temporary frame 72 having a side wall made up of a plurality of side plates each facing a respective inner wall surface of the filter frame 28. Protruding upper and lower parts 74a, 74b extend outwardly from the upper ends and the lower ends of the side plates of the temporary frame 72. An air inlet 76 and at least one tube 78 are interposed between the protruding parts 74a, 74b. A protrusion 80 extends inwardly from the inside wall of the side plates of the temporary frame 72, such that an auxiliary filter 82 can be supported on the protrusion 80.

As in the previous embodiments, the tube 78 may in fact be comprised of a plurality of tubes formed in multiple layers on the side of the temporary frame 72. Generally two such tubes, i.e., a double-layered structure of tubes, is used.

In addition, a penetrating hole extends through the temporary frame 72 at a location corresponding to that of the air inlet 76, and beneath the protrusion 80. The air inlet 76 is connected to the connector end 84 of an air line via the penetrating hole.

Further, as in the previously described embodiments, in order to prevent a gap from forming between the expanded tube 78 and the filter frame, the tube 78 is shaped to correspond to the inner wall surface of the filter frame 28. Alternatively, the filter frame 28 can be curved to conform to the tube 78, or a contact member can be mounted to the filter frame 28.

Moreover, rings 86 are preferably formed on the bottom of the filter frame 28, and a respective chain or other tether 88 is linked to each ring 86. By so hanging the auxiliary device from the filter frame 28, the device will not fall onto the production line should the tube 78 become dislodged from the filter frame.

A handle 90 is provided on the bottom of the bottom of the temporary frame 72 so that an operator can easily grasp and maneuver the auxiliary device.

The method of exchanging a filter according to the present invention will now be described with reference to FIGS. 9a–9e. Although these figures show the method being executed with the embodiment of the auxiliary device of FIG. 8, it would be readily understood by one of ordinary skill in the art that substantially the same method can be used with the other embodiments of the present invention.

The auxiliary device is raised into the filter frame 28 below a damaged filter 22, and the tethers 88 are linked to the rings 86 fixed to the bottom of the filter frame 28.

Figure 9A:
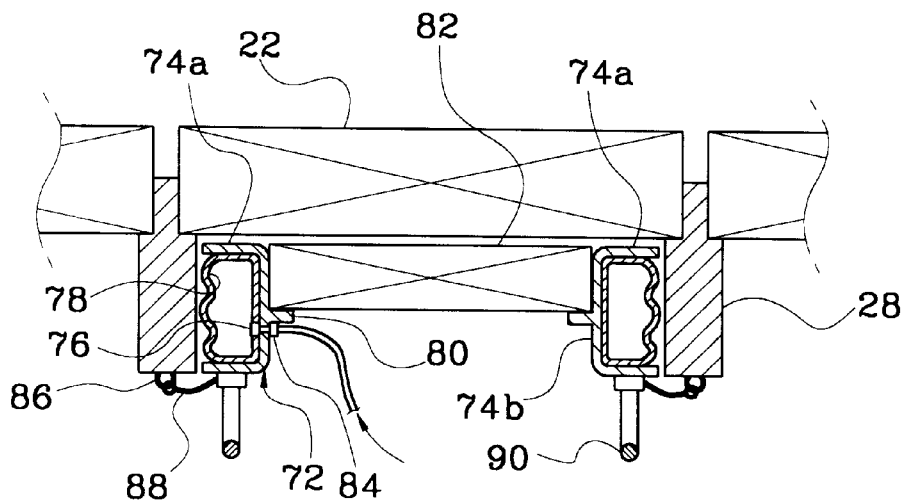
FIGS. 9a–9e are each a sectional view of a portion of the clean room and together show the method of using an auxiliary device in the exchanging of a filter according to the present invention.
Figure 9B:
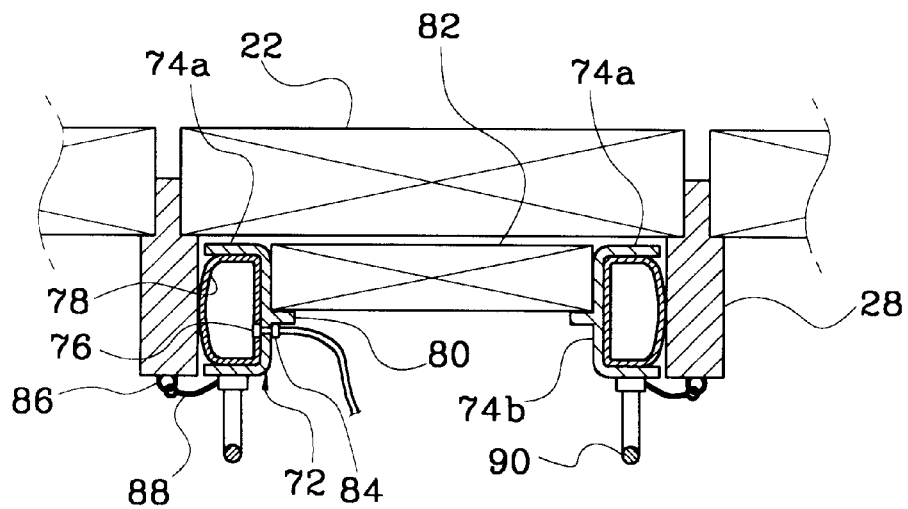

The connector end 84 of the air line is connected to the air inlet 76 so as to introduce the air (in the direction of the arrow) into the tube 78 (FIG. 9a). The tube 78 is expanded by the air and presses against the inner side walls of the filter frame 28 so as to prevent air from flowing through the filter frame 28 below the damaged filter 22 (FIG. 9b). Before the auxiliary device is inserted into the filter frame 28, a contoured contact member (not shown but previously referred to) may be installed on the filter frame in order to prevent a gap from forming between the filter frame 28 and the expanded tube 78.

Figure 9C:
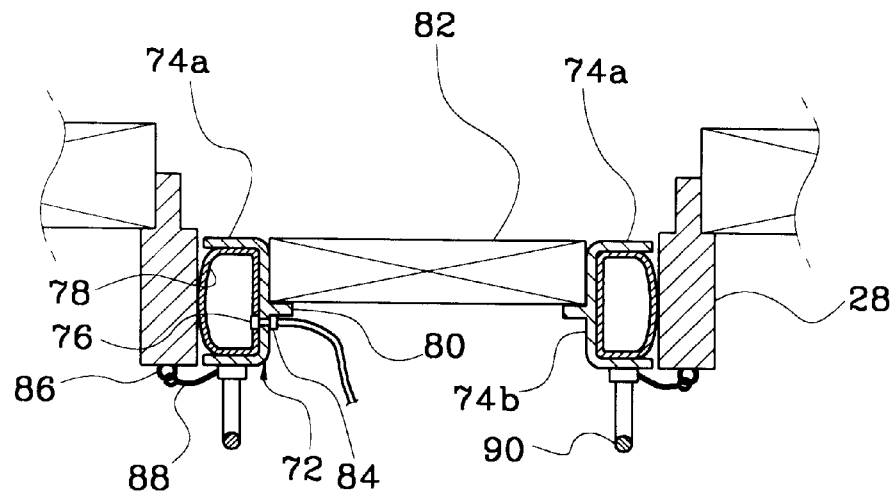
Figure 9D:
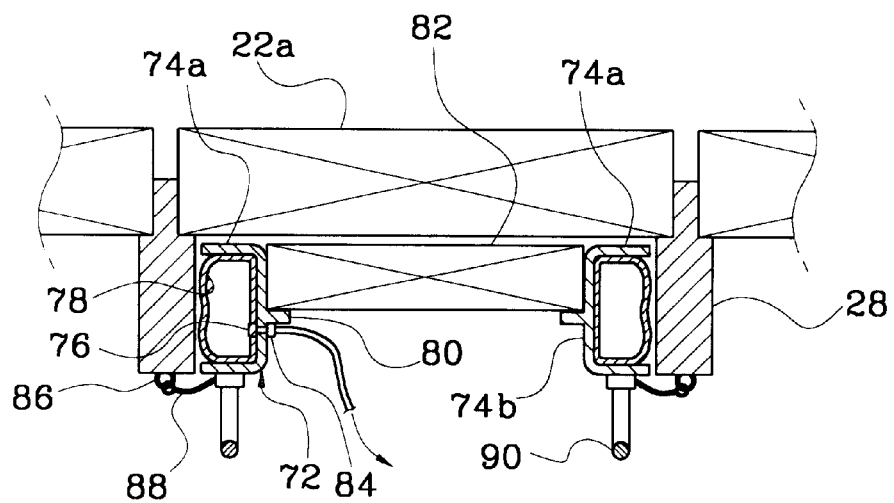
Figure 9E:
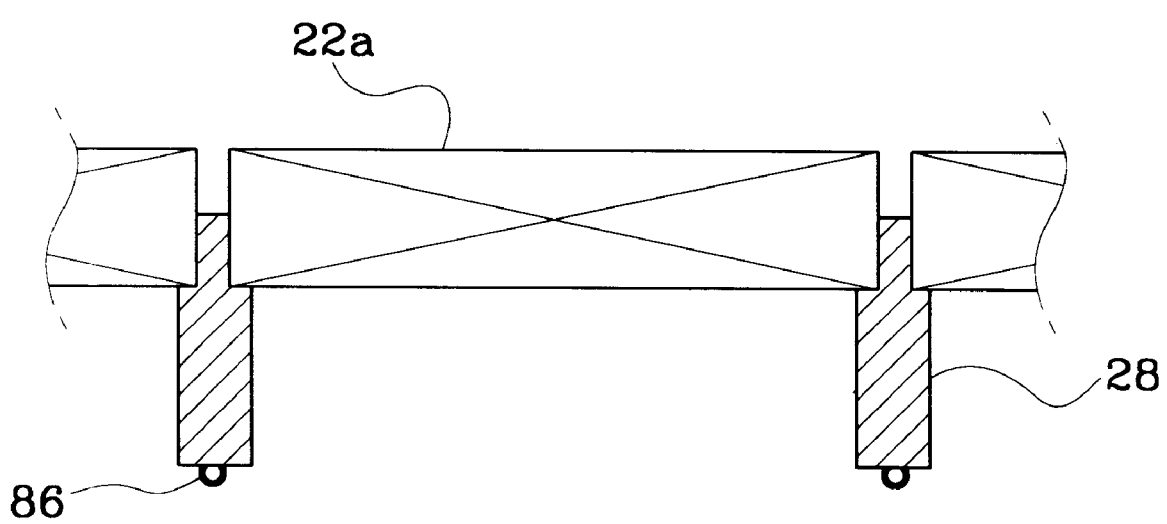

Next, the damaged filter 22 is removed by an operator positioned above the filter frame 28 (FIG. 9c). When the new filter 22a is in place, the air inside the tube 78 is discharged through the air inlet 76 (in the direction of the arrow), until the auxiliary device is freed from the inner side walls of the filter frame 28 (FIG. 9d). The tethers 88 are then disengaged from the rings 86 and the auxiliary device is removed (FIG. 9e).

According to the present invention, an auxiliary device is installed on the filter frame below the damaged filter to be exchanged so that the damaged filter can be easily and rapidly exchanged while the production facility is operational and air is circulated. Therefore, the production line is prevented from being contaminated and the productivity of the line is sustained.

Finally, modifications and variations of the present invention will become apparent to those skilled in the art. Thus, all such modifications and variations that come within the scope of the appended claims are seen to be within the true spirit and scope of the present invention.

What is claimed is:

1. A method of exchanging a filter in a clean room having a production section, a filter frame including a filter-supporting portion which supports the filter and an extending portion which extends from the filter-supporting portion toward the production section, and an air circulation system which circulates air through the filter into the production section, said method comprising the steps of:

fitting an auxiliary device, which prevents unfiltered air from passing therethrough, to the extending portion of the filter frame in a manner that prevents a gap from being left open between the auxiliary device and the extending portion of the filter frame;

after the auxiliary frame is fitted to the extending portion of the filter frame, removing the filter from the filter-supporting portion of the filter frame;

after the filter is removed, mounting a new filter to the filter-supporting portion of the filter frame; and after the new filter is mounted, removing the auxiliary device from the extending portion of the filter frame.

2. A method of exchanging a filter in a clean room as claimed in claim 1, wherein at least said step of removing the filter from the filter-supporting portion of the filter frame is carried out while the air circulation system circulates the air in the clean room.

3. A method of exchanging a filter in a clean room as claimed in claim 1, wherein said step of fitting the auxiliary device to the extending portion of the filter frame comprises inserting the auxiliary device into the extending portion of the filter frame, and subsequently inflating a tube located at an outer periphery of the auxiliary device.

4. A method of exchanging a filter in a clean room as claimed in claim 2, wherein said step of fitting the auxiliary device to the extending portion of the filter frame comprises inserting the auxiliary device into the extending portion of the filter frame, and subsequently inflating a tube located at an outer periphery of the auxiliary device.

5. A method of exchanging a filter in a clean room as claimed in claim 1, and further comprising a step of tethering the auxiliary device to the filter frame before the filter is removed from the filter-supporting portion of the filter frame.

6. A method of exchanging a filter in a clean room as claimed in claim 2, and further comprising a step of tethering the auxiliary device to the filter frame before the filter is removed from the filter-supporting portion of the filter frame.

7. An auxiliary device for use in the exchanging of a filter in a clean room having a production section, and a filter frame including a filter-supporting portion which supports the filter and an extending portion which extends from the filter-supporting portion toward the production section, said device comprising:

a block plate sized to fit within the extending portion of the filter frame;

a support supporting the bottom of said block plate along the outer periphery of the block plate; and at least one inflatable tube disposed along the outer circumference of said support, said at least one tube having an air passage through which air flows for inflating the at least one tube to temporarily secure the auxiliary device to the filter frame.

8. The auxiliary device as claimed in claim 7, wherein said support comprises a plurality of plates facing in different directions and together defining an annular concavity, and said at least one tube being accommodated in said concavity.

9. The auxiliary device as claimed in claim 8, wherein an upper portion of said support is integrated with the bottom of said block plate.

10. The auxiliary device as claimed in claim 7, wherein said support comprises an upper plate facing the bottom of said block plate, a side wall extending downwardly from the periphery of said upper plate, and a protrusion plate extending outwardly from the bottom of said side wall.

11. The auxiliary device as claimed in claim 7, and further comprising a handle mounted on the bottom of said support.

12. The auxiliary device as claimed in claim 7, wherein said at least one tube is of an elastic polymer.

13. The auxiliary device as claimed in claim 7, wherein said block plate comprises a transparent member forming a window.

14. The auxiliary device as claimed in claim 10, wherein said block plate comprises a support plate having a central opening therein and a transparent member covering said central opening, said upper plate having a central opening therein aligned with the transparent member so as to form a window with the transparent member and the central opening of said support plate.

15. The auxiliary device as claimed in claim 14, wherein said transparent member is of an anti-electrostatic transparent acrylic material.

16. The auxiliary device as claimed in claim 14, wherein said transparent member is interposed between said support plate and said upper plate, and further comprising a seal interposed between said support plate and said upper plate and extending along the outer periphery of said transparent member.

17. The auxiliary device as claimed in claim 15, wherein said transparent member is interposed between said support plate and said upper plate, and further comprising a seal interposed between said support plate and said upper plate and extending along the outer periphery of said transparent member.

18. The auxiliary device as claimed in claim 7, and further comprising a tether fixed to the bottom of said support for use in tethering the auxiliary device to the extending portion of the filter frame.

19. The auxiliary device as claimed in claim 14, wherein said transparent member is interposed between said support plate and said upper plate, and said upper plate has a bearing member extending into the central opening therein and supporting the bottom of said transparent member.

20. The auxiliary device for filter exchange as claimed in claim 14, wherein said transparent member is interposed between said support plate and said upper plate, said transparent member having an opening in a central portion thereof, and further comprising a mounting member having the shape of a container, and a filter supported in said mounting member, said mounting member extending from said support plate and through the opening in said transparent member and the central opening in said upper plate to a bottom thereof, and said mounting member having an opening in its bottom.

21. The auxiliary device as claimed in claim 7, comprising a plurality of tubes disposed along the outer circumference of said support.

22. The auxiliary device as claimed in claim 7, further comprising a arcuate sealing member mounted to said extending portion of the filter frame, said arcuate sealing member conforming to a shape of said at least one inflatable tube.

23. An auxiliary device for use in the exchanging of a filter in a clean room having a production section, and a filter frame including a filter-supporting portion which supports the filter and an extending portion which extends from the filter-supporting portion toward the production section, said device comprising:

a temporary frame sized to fit within the extending portion of the filter frame, said temporary frame comprising a side wall having an outer surface and an inner surface, and a protrusion extending inwardly from said inner surface;

at least one inflatable tube disposed along the outer surface of the side wall of said temporary frame, said at least one tube having an air passage through which air flows for inflating the at least one tube to temporarily secure the auxiliary device to the filter frame; and an auxiliary filter supported by the protrusion of said temporary frame.

24. The auxiliary device as claimed in claim 23, and further comprising a handle mounted to the bottom of said temporary frame.

25. The auxiliary device as claimed in claim 23, wherein said temporary frame further comprises an upper part protruding outwardly from an upper end of the side wall thereof, and a lower part protruding outwardly from a lower end of said side wall, said upper part, said side wall and said lower part together forming an annular concavity, and said at least one tube being accommodated in said concavity.

* * * * *